United States Patent Office 2,922,827
Patented Jan. 26, 1960

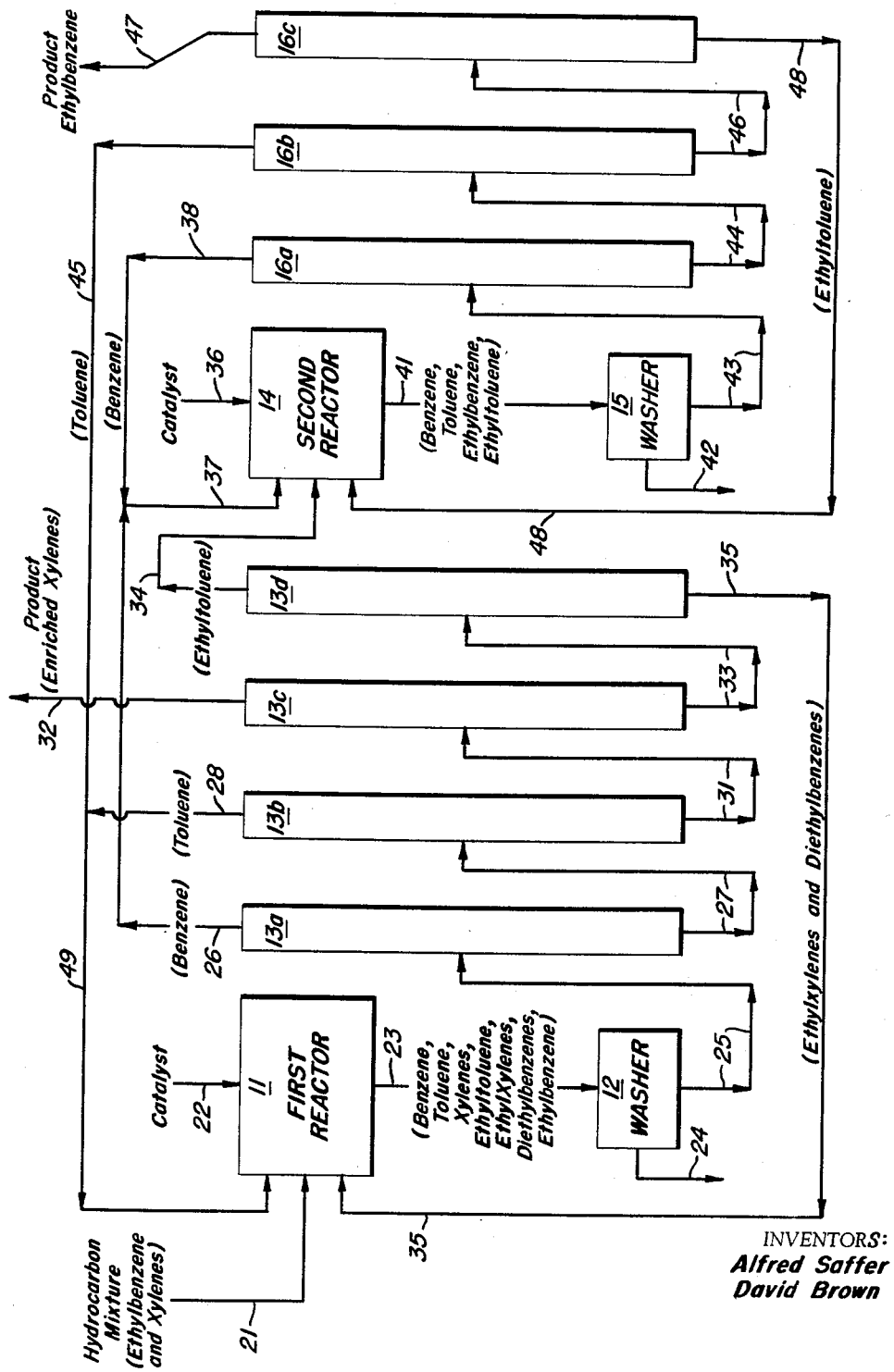

2,922,827
PROCESS FOR SEPARATING ETHYL BENZENE FROM XYLENE-CONTAINING MIXTURES

Alfred Saffer, Bayside, and David Brown, New York, N.Y., assignors, by mesne assignments, to Mid-Century Corporation, Chicago, Ill., a corporation of Delaware Application October 27, 1955, Serial No. 543,169

11 Claims. (Cl. 260—674)

This application is concerned with a procedure for obtaining from crude xylenes which contain ethylbenzene, a xylene-enriched fraction and ethylbenzene. It is more particularly concerned with a method of treating crude mixed xylenes in the presence of an alkylating catalyst and toluene to produce a reaction mixture containing benzene, toluene, ethyltoluene, xylene and ethylated xylenes and benzenes. This mixture is then separated into its separable components by distillation whereby there is produced a xylene-enriched fraction. Any unreacted toluene together with ethylated xylenes and benzene are recycled. The benzene and ethyltoluene are then fed into a second reactor in the presence of an alkylation catalyst to produce a mixture of benzene, toluene, ethyltoluene and as a product, ethylbenzene. The toluene obtained is recycled to the first reactor while the benzene and ethyltoluene are fed to the second reactor. Thus, the overall effect of the sequential process of this invention is to obtain ethylbenzene by the afore-described treatment of crude xylene containing ethylbenzene while at the same time there is obtained a xylene-enriched fraction.

The process of this invention finds utility of the treatment of crude xylene fractions to produce a xylene-enriched fraction suitable for oxidation; for example, by liquid phase oxidation, to produce orthophthalic, terephthalic and isophthalic acids. These acids find utility in a variety of fields including the production of polymers useful, for example, in the preparation of fibers, the preparation of plasticizers and the like. Additionally, the ethylbenzene obtained by the process of this invention can be utilized in the production of styrene by dehydrogenation.

Thus, the present invention overcomes the problem which has faced the industry in providing a novel method of, in effect, separating ethylbenzene from crude xylene obtained from reforming reactions. Heretofore, the separation of ethylbenzene has been extremely difficult and not commercially successful because of the close boiling points of the isomeric xylenes and ethylbenzene.

In a preferred embodiment the present invention embraces the process for obtaining ethylbenzene from a mixture of ethylbenzene and xylene by contacting in a first reactor, in the presence of an alkylation catalyst, said mixture with toluene to produce the first reaction mixture, separating from said first reaction mixture benzene, toluene, a xylene-enriched xylene-ethylbenzene fraction and ethyltoluene; recycling said toluene and the residue of said first reaction mixture to said first reactor; contacting in a second reactor in the presence of an alkylation catalyst said benzene and said ethyltoluene to produce a second reaction mixture, separating from said second reaction mixture benzene, toluene, ethyltoluene and as a product ethylbenzene, recycling said toluene to the first reactor and recycling said benzene and ethyltoluene to said second reactor.

It will be observed that the overall effect of the process of this invention is the separating of ethylbenzene from crude xylene by utilizing an alkylation catalyst.

Suitable alkylation catalysts are illustrated by such compounds as, for example, metallic halides such as, for example, aluminum chloride, ferric chloride, aluminum bromide, molybdenum pentachloride and the like. In general, these and similar catalysts are utilized in amounts of from about 0.1 to 50 mol percent based on the mols of hydrocarbon material being treated. That is in the first reactor, the mols of toluene, xylene, ethylbenzene, ethylxylene and diethylbenzenes; and in the second reactor, the mols of ethyltoluene and benzene. Excellent results are obtained utilizing quantities of catalyst in the range of from 0.5 to 10 mols catalyst to 100 mols hydrocarbon material. It is preferred to utilize amounts of catalysts in the range of about 2.0 to 4.0 mols per 100 mols hydrocarbon. It will be understood that anhydrous hydrogen chloride in amounts equal to about twice the amount of metallic halide catalyst utilized are used in conjunction with such metallic halide catalysts.

The residence time in the reactors generally can be varied in the range from about one-quarter hour to 12 hours. Desirably, the residence time is in the range of from about 2 to 6 hours and it is preferred that the residence time be in the range of from about 3 to 4 hours.

The temperature of the reactors can vary widely within the range of from about -10 to 90° C., excellent results being obtained in the range of from about 30 to 80° C. It is preferred, particularly utilizing aluminum chloride as the metallic halide, to operate in the temperature range of about 70 to 75° C.

Referring to the drawing, there is illustrated a first reactor 11, a washer 12, a series of distillation columns 13a, 13b, 13c and 13d, a second reactor 14, a washer 15, and a further series of distillation columns 16a, 16b and 16c.

In one embodiment of the process of this invention, as illustrated particularly by the drawing, the hydrocarbon mixture of crude xylene, that is, a mixture of ortho, meta- and para-xylenes and ethylbenzene is fed through line 21 to the first reactor. A catalyst, for example, aluminum chloride, is fed to the first reactor 11 through line 22. The reactor 11 can be a corrosion-resistant vessel, for example, having a surface of glass, ceramic or corrosion-resistant metal alloy equipped with agitating means such as a gas or mechanical device and with means of heating or cooling the contents thereof, such as a coil or jacket, a reflux condenser, a gas inlet tube and, optionally, a vent for passing off low boiling materials. Flowing from the first reactor through line 23 to the washer 12 is a first reaction mixture containing benzene, toluene, xylene, ethylbenzene, ethyltoluene, ethylxylene and diethylbenzenes. It will be realized that the catalyst can be and preferably is separated from the first reaction mixture and recycled to the reactor by conventional means (not shown) prior to the addition of the first reaction mixture to the washer 12. In the washer 12, the reaction mixture is washed, for example, with water or aqueous hydrogen chloride and with sodium hydroxide solution. The waste water is discarded through line 24. The washed products flow through line 25 to the distillation column 13a in which benzene is removed by overhead line 26. The remainder of the first reaction mixture flows through line 27 to the distillation column 13b wherein toluene is removed overhead via line 28. The bottoms of column 13b flow through line 31 to distillation column 13c from which are removed overhead a xylene-enriched xylene-ethylbenzene fraction as a product via line 32. The bottom of column 13c flows through line 33 to distillation column 13d where ethyltoluene is removed overhead via line 34. The bottoms of column 13d comprising ethylxylene, and diethylbenzene are recycled via line 35 to the first reactor.

As will be noted, catalyst is added to the second reactor 14 via line 36, ethyltoluene via line 34 and benzene via line 37. Line 37 receives benzene from line 26 as well as line 38.

Flowing through line 41 from the second reactor 14 to the washer 15 is the second reaction mixture comprising benzene, toluene, ethylbenzene and ethyltoluene. Similarly, as afore-described with respect to the catalyst of the first reactor, the catalyst of the second reactor 14 is separated from the second reaction mixture and, if desired, recycled to the second reactor by means (not shown) prior to the addition of the second reaction mixture to the washer 15.

In the washer 15, the second reaction mixture is treated in the manner similar to that described with respect to the first reaction mixture in washer 12, the waste water being discarded through line 42. The washed second reaction is led via line 43 to the distillation column 16a wherein benzene is removed overhead via line 38 which, as afore-described, leads to line 37 and thence to the second reactor. The bottoms of column 16a flow through line 44 to column 16b wherein toluene is removed overhead via line 45 which recycles the toluene through line 49 to the first reactor 11. The bottoms of column 16b flow through line 46 to column 16c. In this column ethylbenzene is removed overhead through line 47 as a desired product and the bottoms of column 16c comprising ethyltoluene are recycled via line 48 to the second reactor.

It will be realized, of course, that the drawing illustrates schematically the equipment which can be utilized in one embodiment of the present invention and that a variety of essential auxiliary pieces, such as, for example, valves, reflux condensers and the like, are not illustrated.

The process of the present invention can be operated in a batch, intermittent or a continuous manner.

As an illustration of the operation in a continuous manner, 131 mols of a crude xylene mixture containing 92 mols xylenes and 39 moles ethylbenzene are fed into the first reactor 11 per unit time. In the following description, reference to mols is to be understood to connote mols per unit time. Similarly, there is added through line 49, 168 mols toluene and through line 35, 7.9 mols of a mixture of ethylxylene and diethylbenzene. There is added through line 22, 7.2 mols aluminum chloride and 14.4 mols of anhydrous hydrogen chloride. The residence time in the first reactor is maintained at about four hours and the temperature at about 75° C. Flowing from the first reactor through line 23 is 306.9 mols of hydrocarbon mixture containing

|  | Mols |
|---|---|
| Benzene | 28.0 |
| Toluene | 140.0 |
| Xylene | 91.8 |
| Ethylbenzene | 11.2 |
| Ethyltoluene | 28.0 |
| Ethylxylene | 7.0 |
| Diethylbenzene | 0.9 |

This mixture flows to column 13a where the 28 mols benzene is separated overhead and sent via lines 26 and 37 to the second reactor 14. The bottoms of column 13a flow to column 13b where the 140.0 mols toluene is separated overhead and flows via lines 28 and 49 to the first reactor. The bottoms of column 13b flow to column 13c where through overhead line 32 there is obtained 103 mols of an enriched xylene-ethylbenzene mixture containing 91.8 mols xylene and 11.2 mols ethylbenzene. This is to be compared to the original xylene-ethylbenzene mixture which contained 39 mols ethylbenzene per 92 mols xylene.

It is to be noted, the original crude xylene mixture is not acceptable, for example, for utilization in the preparation of dibasic acids because of the presence of objectionable amounts of ethylbenzene which, upon oxidation, yields a monobasic acid which contaminates the dibasic acids. On the other hand, the xylene enriched fraction obtained from the column 13c contains ethylbenzene in amounts which are not objectionable for such use. Additionally, the product (ethylbenzene) of column 16c can be used for the production of styrene.

From column 13d there is removed as overhead 38 mols ethyltoluene via line 34 which is delivered to the second reactor 14. From the bottom of column 13d, there is removed 7.9 mols of a mixture of 7.0 mols ethylxylene and 0.9 mol diethylbenzene. This mixture is recycled via line 35 to the first reactor 11.

Into the second reactor 14, there is fed the 28 mols ethyltoluene via line 34, 48 mols benzene via line 37 and 20 mols ethyltoluene via line 48. Of the 48 mols benzene in line 37, 28 mols are obtained via line 26 from column 13a and 20 mols from column 16a via line 38. Also to the second reactor is added aluminum chloride catalyst in an amount of 2.3 mols together with 4.6 mols anhydrous hydrogen chloride. The residence time in the second reactor is maintained at about four hours and the temperature at 75° C. Flowing from the second reactor via line 41 is 96 mols of a hydrocarbon mixture containing 20 mols benzene, 28 mols toluene, 28 mols ethylbenzene and 20 mols ethyltoluene. The 20 mols benzene is separated in column 16a and returned to the second reactor via lines 38 and 37. The 28 mols toluene is separated in column 16b and returned via lines 45 and 49 to the first reactor 11.

In column 16c there is separated as overhead via line 47 as product 28 mols ethylbenzene. The bottoms of column 16c containing 20 mols ethyltoluene are recycled via 48 to the second reactor 14.

It will be noted that the starting crude xylene mixture consisted of 131 mols, and that the two products total 131 mols; that is, 28 mols ethylbenzene and 103 mols of a xylene-ethylbenzene mixture containing 91.8 mols xylene and 11.2 ethylbenzene. Thus, the overall effect of the sequential operations described is the separation of a large portion of the ethylbenzene from the crude xylene mixture. This provides, as afore-described, a xylene-enriched xylene-ethylbenzene mixture which can be utilized in the preparation of dicarboxylic acids as well as ethylbenzene which, as afore-described, can be utilized in the production of styrene by dehydrogenation.

The foregoing description illustrates an overall sequence in which only xylenes and ethylbenzene are fed to and removed from the system. It will be realized that, optionally, there can be removed such products in the various stages of the process as ethyl-xylenes which have value as excellent blending hydrocarbons.

The foregoing description illustrates the removal of approximately 72% of the ethylbenzene in the original crude xylenes. The percentage figure can be increased by the utilization of larger amounts of toluene than that described. That is, the greater amount of toluene utilized is compared to a given amount of crude xylene the greater is the amount of ethylbenzene separated from the crude xylene mixture. In general, there is utilized from about 1 to 20 mols toluene per mol ethylbenzene in the crude xylene mixture. Desirably, from about 1.5 to 9 mols toluene per mol tolene per mol ethylbenzene in the crude xylene mixture is utilized. Preferably, there is utilized from about 2 to 6 mols toluene per mol of ethylbenzene in the crude xylene mixture.

There can be substituted for the aluminum chloride utilized above such metallic halide alkylation catalysts as aluminum bromide, ferric chloride and molybdenum pentachloride in conjunction with hydrogen chloride to effect, according to the foregong scheme, the overall separation of ethylbenzene from crude xylene mixtures, In general, variation of the amount of catalysts utilized within the described ranges results in variations in the residence time and temperature required to effect the conversions afore-described; that is, the greater the amount of catalyst the shorter the residence time; further, increase in the amount of catalyst enables operation at a slightly lower temperature than the ranges afore-described.

In view of the foregoing disclosures, variations, and modifications thereof will be apparent to one skilled in the art and it is intended to include within the invention all such variations and modifications as do not come within the scope of the appended claims.

We claim:

1. A process for the separation of ethylbenzene from admixture with xylene which comprises contacting in a first reactor a mixture containing ethylbenzene and xylene with toluene in an amount of from 1 to 20 moles per mole of ethylbenzene in the presence of a metallic halide selected from the class consisting of ferric chloride, molybdenum pentachloride, aluminum bromide and aluminum chloride in an amount of from 0.001 mole to 0.5 mole per total mole of total hydrocarbon at a temperature in the range of from −10 to 90° C. to produce a first reaction mixture; separating from said first reaction mixture benzene, toluene, a xylene enriched xylene-ethylbenzene fraction, ethyltoluene and a higher boiling hydrocarbon residue; recycling said toluene and the higher boiling hydrocarbon residue of said first reaction mixture to said first reactor; contacting in a second reactor said benzene and said ethyltoluene in the presence of a metallic halide selected from the class consisting of ferric chloride, molybdenum pentachloride, aluminum bromide and aluminum chloride in an amount of from 0.001 mole to 0.5 mole per moles of total hydrocarbon at a temperature of from −10 to 90° C. to produce a second reaction mixture; separating from said second reaction mixture benzene, toluene, ethylbenzene and ethyltoluene; recycling said toluene to the first reactor; and recycling said benzene and ethyltoluene to said second reactor.

2. The process of claim 1 wherein the metallic halide is ferric chloride.

3. The process of claim 1 wherein the metallic halide is aluminum bromide.

4. The process of claim 1 wherein the metallic halide is aluminum chloride.

5. The process of claim 1 wherein the metallic halide is aluminum chloride and is used in the amount of from 0.001 to 0.1 mole per mole total hydrocarbon.

6. The process of claim 1 wherein the metallic halide is molybdenum pentachloride.

7. The process of claim 1 wherein the reaction temperature in each reactor is in the range of 30° to 80° C.

8. The process of claim 1 wherein the reaction temperature in each reactor is below 75° C.

9. The process of claim 1 wherein the amount of toluene employed in the first reactor is from 1.5 to 9.0 moles per mole of ethylbenzene.

10. A process for the separation of ethylbenzene from admixture with xylene which comprises contacting in a first reactor a mixture containing ethylbenzene and xylene with toluene in an amount of from 2 to 6 moles per mole of ethylbenzene in the presence of aluminum chloride in an amount of from 0.02 to 0.04 mole per mole of total hydrocarbon at a temperature in the range of from 70° to 75° C. to produce a first reaction mixture; separating from said first reaction mixture benzene, toluene, a xylene-enriched xylene-ethylbenzene fraction, ethyltoluene and a higher boiling hydrocarbon residue; recycling said toluene and the higher boiling hydrocarbon residue of said first reaction mixture to said first reactor; contacting in a second reactor said benzene and said ethyltoluene in the presence of aluminum chloride in an amount of from 0.02 to 0.04 mole per mole total hydrocarbon at a temperature of from 70° to 75° C. to produce a second reaction mixture; separating from said second reaction mixture benzene, toluene, ethylbenzene and ethyltoluene; recycling said toluene to the first reactor; and recycling said benzene and ethyltoluene to said second reactor.

11. The process of claim 10 wherein the mixture containing ethylbenzene and xylene is a crude xylene obtained from reforming reactions.

References Cited in the file of this patent

UNITED STATES PATENTS

| | | |
|---|---|---|
| 2,725,413 | McCaulay et al. | Nov. 29, 1955 |
| 2,734,930 | Schlatter | Feb. 14, 1956 |

OTHER REFERENCES

Thomas: *Anhydrous Aluminum Chloride*, (1941), Rheinhold Publishing Corp., 330 W. 42nd Street, New York, N.Y., pages 690 and 691.